UNITED STATES PATENT OFFICE.

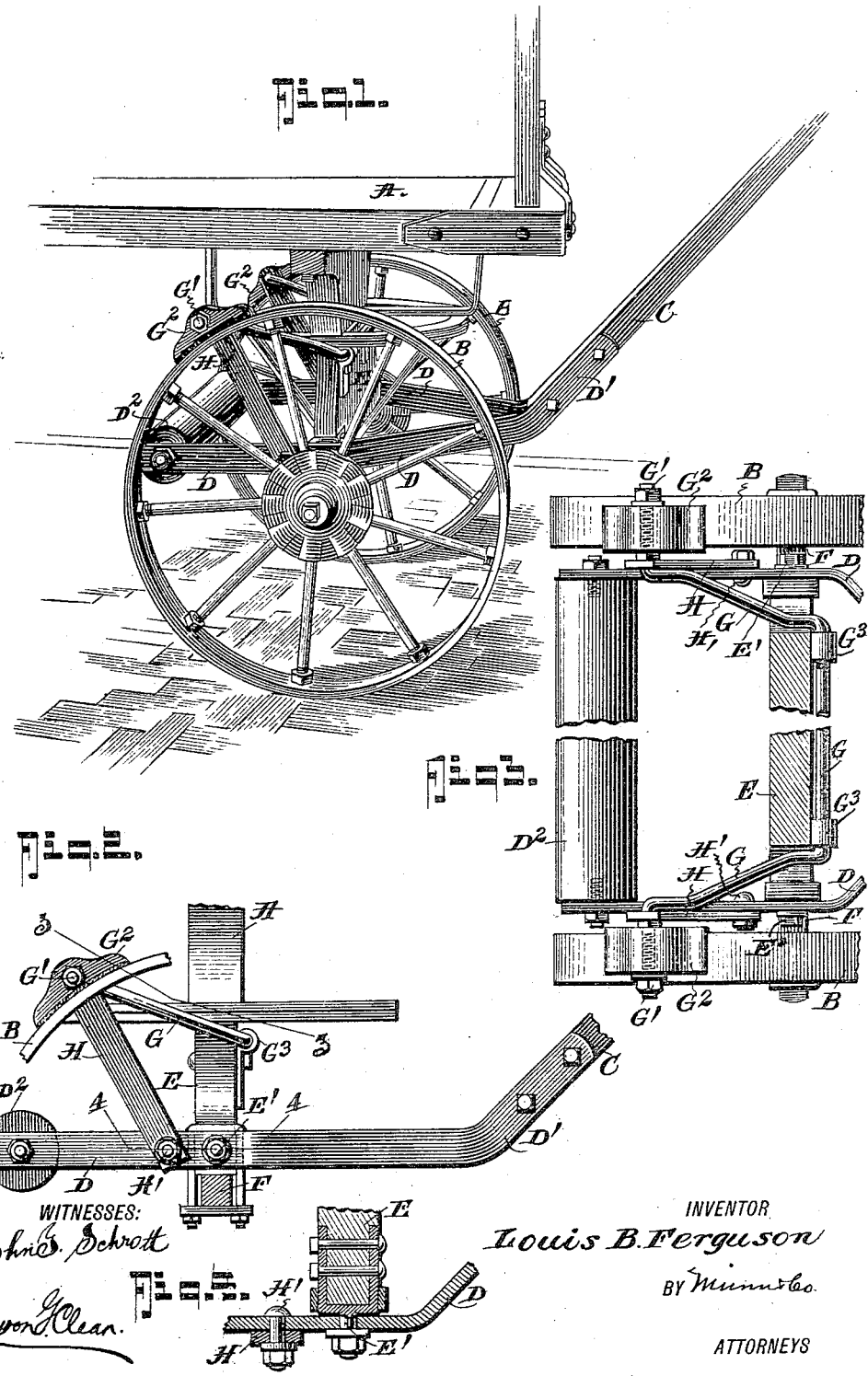

LOUIS B. FERGUSON, OF MONROE, LOUISIANA, ASSIGNOR OF ONE-HALF TO AMERICAN SALES CO., OF MONROE, LOUISIANA, A CORPORATION OF LOUISIANA.

BAGGAGE-TRUCK.

1,244,970.  Specification of Letters Patent.  Patented Oct. 30, 1917.

Application filed December 22, 1915. Serial No. 68,215.

*To all whom it may concern:*

Be it known that I, LOUIS B. FERGUSON, a citizen of the United States, and a resident of Monroe, in the parish of Ouachita and State of Louisiana, have invented a certain new and useful Improvement in Baggage-Trucks, of which the following is a specification.

My present invention relates generally to baggage trucks utilized upon station platforms and at similar points, for the transportation of baggage and the like, the primary object of my invention being to provide in connection with the usual truck construction, certain attachments or additions in the interest of safety, both to passengers and pedestrians and the railway property in connection with which the truck is utilized.

Further and more particularly, an object of my invention is to provide certain means for effecting vertical movement of the truck handle to an elevated position sufficient to eliminate all danger of tripping over the handle as present in its usual position resting upon the ground.

A further and particular object of my invention is to provide a brake member engageable with one of the wheels of the truck, together with automatic means for effecting engagement of the brake with the wheel when the handle of the truck is released, so as to check further movement of the truck and prevent the same from running wild on the platform to the danger of passengers, or upon the railway track to the danger of the rolling stock.

A still further object of my invention is to provide such means for the above purpose as will effect simultaneous raising of the handle and application of the brake member through simple and inexpensive changes to the ordinary truck structure, and without interference with its complete operation in use as at present.

Referring now to the accompanying drawing in which my invention is illustrated:

Figure 1 is a perspective view of the forward portion of a baggage truck, illustrating the application of my improvements thereto.

Fig. 2 is a side elevation illustrating my improvements in connection with certain parts of the truck.

Fig. 3 is a horizontal sectional view taken substantially on line 3—3 of Fig. 2.

Fig. 4 is a detail horizontal section substantially on line 4—4 of Fig. 2.

Referring now to these figures, I have generally shown the main frame of a baggage truck at A in Fig. 1, supported upon wheels of which the forward wheels are shown at B.

The handle C by which the truck is moved from place to place is, in accordance with my invention, securely bolted to the forward upturned end $D'$ of a pair of side frame bars D flared outwardly intermediate their ends in a rearward direction, and extending rearwardly upon opposite sides of the sand board E to which is secured the axle F as shown in Fig. 2, and between said sand board E and the wheels B, and having their rear ends connected by a transverse weight $D^2$ sufficient to elevate the handle C to an upwardly inclined position as shown in Fig. 1 when released, the frame including the several parts just mentioned, being intermediately pivoted to the sand board by means of the bolts $E'$ extending through side bars D, one of which is plainly seen in Fig. 4.

Securely mounted upon the angular ends $G'$ of a U-shaped brake hanger G, are brake shoes $G^2$ engaging the peripheral surface of the forward truck wheels B as clearly seen by reference to Figs. 1 and 3, the hanger G being mounted in bearings $G^3$ upon the wheel truck E and having connecting bars H loosely connected to its angular extensions $G'$ and to the side bars D of the swinging frame before described, it being noted that these latter connections as seen at $H'$ in Fig. 2, are at points rearwardly of the pivot bolts $E'$ of the lower frame so that when the handle B of the truck is released and elevated through the action of weight $D^2$ as before described, the brake members $G^2$ will be drawn downwardly against the wheel peripheries at the same time, to simultaneously check further movement of the truck for the purposes before mentioned.

It will thus be seen that my improvements not only effect the elevation of the handle and operate as a check upon movements of the truck in disuse, but are such as to be readily and quickly applied in connection with trucks now in use, with a minimum expense, and without danger of interfering with the normal operation of such trucks at present.

I claim:—

1. In a truck of the character described, a wheeled frame, including a forward sand board, a vertically swinging frame intermediately pivoted to the said forward sand board and including a rear weight whereby to normally elevate its forward end, a truck handle secured to the forward end of the said vertically swinging frame and movable vertically therewith under the effect of the said rear weight when released, a pair of brake members engaging the forward truck wheels, a U-shaped support therefor, the cross bar of which extends horizontally along and is journaled upon the said forward sand board, and at the extensions of which said brake members are carried, and connecting bars pivotally secured at their upper ends to the said brake members and at their lower ends to the said vertically swinging frame at points rearwardly of the pivots thereof, whereby to effect application of the brake members to the wheels simultaneously with the raising of the handle upon its release.

2. In a truck of the character described including a forward sand board and a handle, a pair of side bars normally extending in a horizontal position at opposite ends of, and pivoted intermediate their ends to, the said sand board, said bars having forward convergent ends secured to and supporting the handle, a weight connecting the rear ends of said bars to normally hold the handle in elevated position, a U-shaped supporting member the cross bar of which is journaled horizontally along the sand board and the extensions of which project rearwardly, brake members pivotally connected to the rear ends of said extensions, and connecting arms pivotally connected at their upper ends to the said brake members and similarly connected at their lower ends to the said side bars at points rearwardly of the intermediate pivots of the latter.

3. In a truck of the character described including a sand board and a handle, a combined brake applying and handle controlling attachment including a weighted frame connected to and carrying the handle and pivoted to opposite ends of the sand board, a U-shaped brake supporting member the cross bar of which is journaled horizontally and transversely of the sand board and the extensions of which project rearwardly, brake members pivotally supported by the said extensions, and connecting arms pivotally connected to the said brake members and to the said weighted frame, all for the purpose described.

LOUIS B. FERGUSON.

Copies of this patent may be obtained for five cents each, by addressing the "Commissioner of Patents, Washington, D. C."